United States Patent
Castellon

(10) Patent No.: US 6,439,357 B1
(45) Date of Patent: Aug. 27, 2002

(54) SYSTEM FOR CONTINUOUS ENERGY ABSORPTION WITH RELATIVE DISPLACEMENT, BY SQUEEZING A METALLIC STRIP BETWEEN TWO COMPONENTS OF DEFINED SECTION

(76) Inventor: Melchor Daumal Castellon, Diputacion, 455, 08013 Barcelona (ES)

( * ) Notice: Subject to any disclaimer, the term of this patent is extended or adjusted under 35 U.S.C. 154(b) by 0 days.

(21) Appl. No.: 09/514,236

(22) Filed: Feb. 28, 2000

(30) Foreign Application Priority Data

Feb. 26, 1999 (ES) .............................................. 9900397

(51) Int. Cl.⁷ .................................................. F16F 7/12
(52) U.S. Cl. ...................................... 188/374; 188/371
(58) Field of Search ................................ 188/371, 372, 188/373, 374, 377

(56) References Cited

U.S. PATENT DOCUMENTS

| | | | | |
|---|---|---|---|---|
| 2,578,903 A | * | 12/1951 | Smith | 188/371 |
| 3,132,721 A | * | 5/1964 | Jackson | 188/371 |
| 3,308,908 A | * | 3/1967 | Bunn | 188/371 |
| 3,398,812 A | * | 8/1968 | Peterson | 188/377 |
| 3,482,653 A | * | 12/1969 | Maki et al. | 188/371 |
| 3,504,567 A | * | 4/1970 | Ohashi et al. | 188/371 |
| 3,538,785 A | * | 11/1970 | Grancon | 188/371 |
| 3,717,046 A | * | 2/1973 | Takao et al. | 188/371 |
| 3,865,418 A | * | 2/1975 | Saxl | 293/89 |
| 3,916,720 A | * | 11/1975 | Smith | 74/492 |
| 3,917,030 A | * | 11/1975 | Morley et al. | 188/371 |
| 3,968,863 A | * | 7/1976 | Reilly | 188/371 |
| 4,006,647 A | * | 2/1977 | Oonuma et al. | 74/492 |
| 4,142,423 A | * | 3/1979 | Ikawa | 188/371 |
| 4,181,198 A | * | 1/1980 | Lindberg | 188/371 |
| 4,317,373 A | * | 3/1982 | Goes et al. | 73/787 |
| 4,358,136 A | * | 11/1982 | Tsuge et al. | 280/806 |
| 4,978,139 A | * | 12/1990 | Andres et al. | 280/805 |
| 5,314,204 A | * | 5/1994 | DuRocher et al. | 280/777 |
| 5,487,562 A | * | 1/1996 | Hedderly et al. | 280/777 |
| 5,725,267 A | * | 3/1998 | Grosser et al. | 293/133 |
| 5,971,489 A | * | 10/1999 | Smithson et al. | 297/472 |
| 6,062,355 A | * | 5/2000 | Nohr et al. | 188/374 |

* cited by examiner

Primary Examiner—Paul N. Dickson
Assistant Examiner—Benjamin A Pezzlo
(74) Attorney, Agent, or Firm—Ostrolenk, Faber, Gerb & Soffen LLP

(57) ABSTRACT

A system for continuous energy absorption with relative displacement, by squeezing a metallic strip between two components of defined section comprising three separate components which are an upper component, a lower component and a strip. The upper components has a bottom surface; the lower component has a top surface spaced from and extending complementarily to the upper surface, each of the top and bottom surfaces having spaced apart first and second portions and an intermediate portion between the first and second portions located between and joining first and second portions, the intermediate portion being bent off from both of the first and second portions; and a metallic strip squeezed between the top and bottom surfaces of the upper and lower components and the metallic strip conforms to the top and bottom surfaces. The first and second components and the metallic strip can move relative to each other and produce an amount of energy in response to the application of a specific load applied to at least one the upper component, the lower component, and to the strip.

9 Claims, 1 Drawing Sheet

SYSTEM FOR CONTINUOUS ENERGY ABSORPTION WITH RELATIVE DISPLACEMENT, BY SQUEEZING A METALLIC STRIP BETWEEN TWO COMPONENTS OF DEFINED SECTION

The present application for a Patent of Invention relates, as indicated in its title, to a "A SYSTEM FOR CONTINUOUS ENERGY ABSORPTION WITH RELATIVE DISPLACEMENT, BY SQUEEZING A METALLIC STRIP BETWEEN TWO COMPONENTS OF DEFINED SECTION", whose new characteristics of construction, form and design fulfil with maximum reliability and efficacy the purpose for which it has specifically been designed.

Energy absorption mechanisms exist on the market, and may therefore be regarded as prior art, which have to a certain extent to be capable of adsorbing a certain amount of energy, on application of a particular load, as well as permitting relative displacement between the components which form said mechanisms.

For example, motor vehicle impact safety systems, such as steering columns, which have to absorb the energy from the aforesaid impact, which have to absorb the energy from the aforesaid impact, while simultaneously moving away from the passengers in the vehicle.

The system proposed allows energy absorption in a controlled and continuous manner, at the same time as allowing relative movement between the components constituting the system, by means of an assembly formed of three components: a metallic strip (or a strip of other materials whose characteristics are sufficient for the required purpose), is squeezed under the pull of a load applied externally in the longitudinal direction, via two mutually complementary components, whose inner profiles are in contact with said strip, deforming and guiding it while maintaining the surface which causes the aforesaid displacement.

Although this system is designed specifically as a collapsing mechanism for motor vehicle steering columns, this does not exclude the possibility of its being used for other applications, owing to its simplicity and ease of functioning.

The invention relates to an energy absorbing system, which simultaneously permits relative and continuous displacement between components which form the system constituting a basic assembly which, although it may optionally admit of other applications, has been specifically designed for incorporation as a collapsing element for motor vehicle steering columns, that is to say in mechanisms used for transmitting rotation from the steering wheel to the steering box of the vehicle.

More specifically, the present invention relates to a squeezing system which acts as a collapsing mechanism with continuous load absorption, which is actuated by the application of a defined load in the longitudinal direction and for a defined period, the energy of which is absorbed by means of the progressive deformation of a strip, most probably metallic, which passes through two components with complementary profiles, also metallic and of material with similar characteristics, which act as guides during the above-mentioned squeezing, which may take place, for example, when the steering system, in the face of an impact, performs its role as a vehicle safety system.

As is well known, a squeezing process may conventionally be performed by the assembly formed by two members of suitable profile to allow the material which flows through it to undergo defined deformation by being pulled between the two components under axial load.

It is important to emphasize that, while, in the type of shaping process under consideration, the material to be squeezed is generally mobile with respect to the two guide components, which are customarily considered as stationary, the present invention also provides the option of the strip being stationary, while the other two components, in the case presented as an example or just one in other cases, effect the longitudinal movement, caused by the predetermined force caused by the load applied in the axial direction, deforming the strip in progressive manner during the continuous pulling thereof, simultaneously facilitating energy absorption in a controlled manner and exercising, in this way, the collapsing function required of the steering column.

On the other hand, in accordance with requirements of steering column functionality and design, both from the point of view of the relative position of the strip and its fixing system, various variations in embodiment are possible without altering the essential nature of the invention idea forming the basis of the present invention.

Thus, among the many arrangements which are broadly speaking possible, the assembly consisting of the three components involved in the squeezing process may be located either horizontally or vertically, as well as in the opposite or same direction as that in which the force is applied, its being additionally possible to arrange several squeezing assemblies in parallel, symmetrically or in reverse, with all the possible combinations which may be considered of use for specific applications.

Likewise, depending on the functionally it is wished to provide for this energy absorption system and the manner in which guidance is to be effected, the strip may be located fastened between the two ends thereof, or indeed at one alone if it is wished to provide it with the greatest degree of freedom, as far as mobility is concerned.

There has as yet been no mention of the section of the strip in question, but it is clear that it may be of any form, depending on the specific requirements of each type of application, including having a section which is variable over the entire length thereof or part thereof, if energy absorption requirements make such an embodiment necessary.

In short, the present invention has at its object the provision of an energy absorption system which is not only capable of dimensional adaptation so as to be perfectly compatible with mounting the assembly of the combined components in the steering column, but also permits optimum control of the amount of energy to be absorbed and the continuous process in which said energy absorption occurs, by means of a suitable design, from the point of view both of dimensions and mounting of the three basic components of this system and of precise selection of the materials of which they are composed, in order that their arrangement and mechanical functionality are effective while simultaneously allowing great simplicity and reduced cost.

Other details and characteristics of the current application for a Patent of Invention will become clear from a reading of the description given below, which refers to the Figures accompanying this specification, in which the details referred to are shown. These details are given by way of example, referring to one possible practical embodiment which is not limited to those details described here, therefore, this description should be regarded as an illustration, not limiting in any way.

There follows a detailed list of the various elements cited in the present application for a Patent of Invention (10) strip, (11) upper component, (12) lower component.

Figure 1:
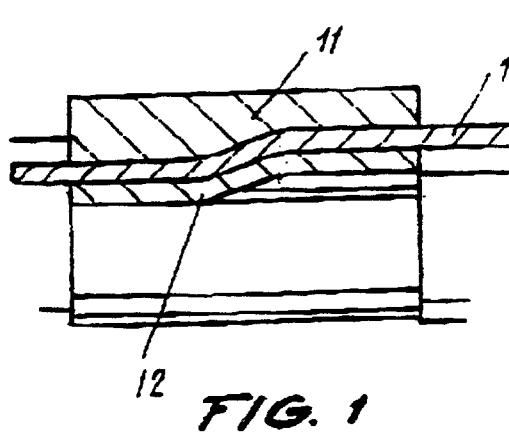
FIG. 1 is a longitudinally sectional front view of the proposed energy absorption system, applied to a defined steering column presented by way of example.

As may be seen from FIG. 1, it should be noted that the amount of energy absorbed is linked in this system very directly to the shape and dimensions of the squeezing profile formed by the upper component (11) and the lower component (12), through which the strip (10) passes when the relative displacement is produced which causes its deformation. Therefore, the main priority is optimum development in the design of the profile of the components (11) and (12) to obtain a suitable, continuous progression of the squeezing of the strip (10) during the entire duration thereof, in such a way that energy absorption and guidance of the assembly during the movement meets the technical specifications required for the steering column in question.

In addition, it is obvious that, depending on the direction of action of the load applied and the objective of a specific application, the relative arrangement of the strip with respect to the other two components may be varied such that the squeezing occurs towards the load, thereagainst and at a certain angle of inclination. The degree of grip between the upper (11) and lower (12) components also allows adjustment and control of the amount of energy absorbable by deformation of the strip (10).

Figure 2:
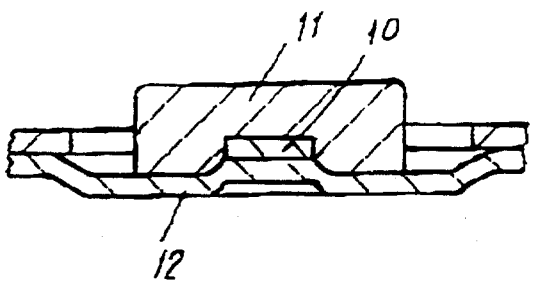
FIG. 2 is a cross-sectional side view, corresponding to the system in question, at the same steering column, included so as better to clarify the relative location of the components constituting he system.

With reference to FIG. 2, which shows the rectangular section of the strip in this Example, it may be emphasized that said strip may exhibit a wide variety of possible sections, in view of the wide range of applications for which this energy absorption system may be used. For various reasons, it is also feasible to replace the signal strip (1) with several strips of smaller section for one and the same assembly of components (11) and (12).

Likewise, the system could be arranged in an inverted position, if such an arrangement should prove necessary for various reasons to do with assembly and design. This FIG. 2 also allows consideration of possible alternatives to the horizontal arrangement shown in the example, for instance the arrangement may be lateral or vertical, inclined or at a certain angle, or exhibit a combination of the various options, in such a way that the number of energy absorber units may vary depending on both technical and dimensional requirements or needs.

Figure 3:
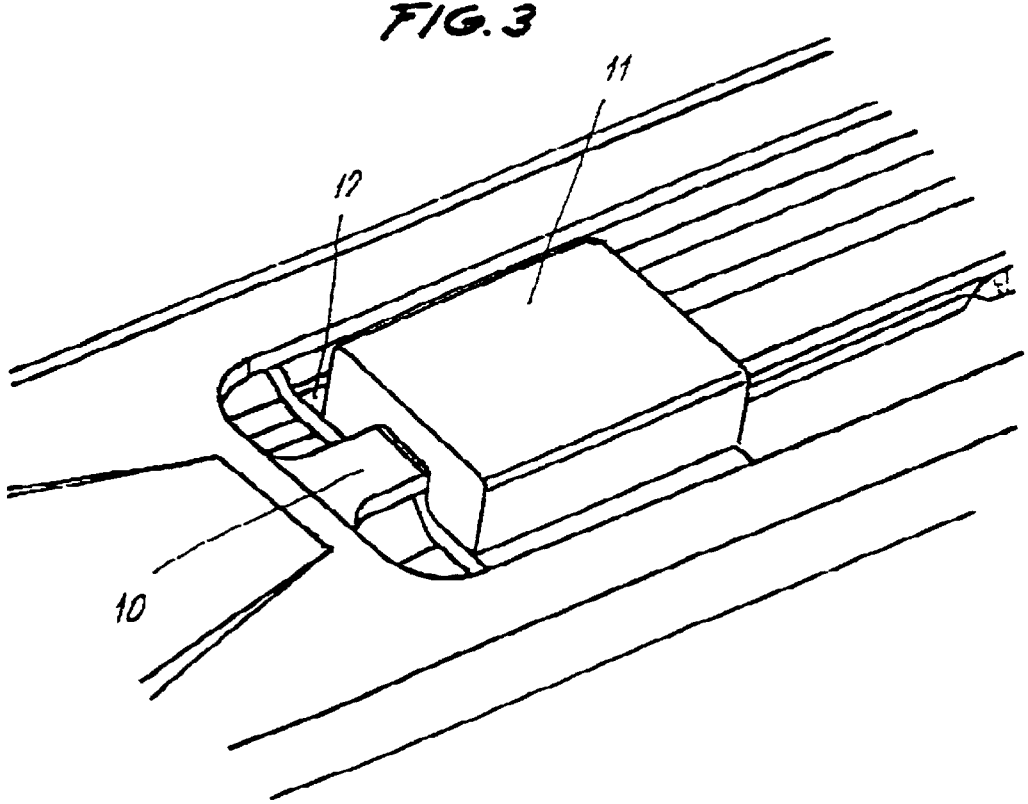
FIG. 3 is a three-dimensional perspective view, complementing the views in the previous Figures and adding clarity to assist in understanding the essential nature of the present invention.

With regard to FIG. 3, in addition to the range of dimensions available with regard to the relative position between the various components which constitute the system, it is also possible to vary the fixing means available for the various components of the example. Thus, the strip (1) is fastened to the main flange by one of its ends, but it may also be fixed by both, if it proves convenient, and it may even be an integral part of the flange itself. For their part, the components (11) and (12) are shown fastened together while being capable of exhibiting very different forms, depending on the design or assembly of the steering column or on the application in question.

FIG. 3 also shows that the components (11) and (12) have to allow relative movement with respect to the strip (10) so that deformation may occur upon application of the load in the longitudinal direction, it being possible either for the latter to move or for the other two components to undergo the above-mentioned relative movement, as occurs in the current example.

Finally, it should be noted that, although the load under consideration is axial and the deformation produced is in the longitudinal direction, applications may arise in which neither the direction of the load nor the deformation coincides with those under consideration in the example in question, but, in any case, the present invention may be applied effectively.

The subject matter of the present application for a patent of invention has been adequately described, in relation to the attached drawings, and it will be understood that any modifications in detail may be made to the same which are considered advantageous as long as the proposed variations do not alter the essence of the present patent summarized in the following claims.

What is claimed is:

1. A system for continuous energy absorption, comprising:

first and second components having opposing surfaces spaced apart and extending complementarily to one another, each of the opposing surfaces having spaced apart first and second portions, and an intermediate portion extending between and joining the first and second portions the intermediate portion being bent off from both of the first and second portions; and a strip squeezed between the opposing surfaces so that when a sufficient load is applied to either the first and second components or the strip, the components and the strip move relative to one another to bend the strip continuously so that the strip extends complementary to the opposing surfaces during the relative displacement, whereby the relative displacement produces energy.

2. A system according to claim 1, wherein the first and second portions of the opposing surfaces of the first and second components extend in a horizontal direction or in a vertical direction and are parallel to one another.

3. A system for continuous energy absorption comprising:

an upper component having a bottom surface, a lower component having a top surface spaced from and extending complementarily to the upper surface, each of the top and bottom surfaces having spaced apart first and second portions and an intermediate portion between the first and second portions located between and joining first and second portions, the intermediate portion being bent off from both of the first and second portions and a metallic strip squeezed between the top and bottom surfaces of the upper and lower components and the metallic strip conforms to the top and bottom surfaces, the first and second components and the metallic strip can move relative to each other and produce an amount of energy in response to the application of a specific load applied to at least one the upper component, the lower component, and to the strip.

4. A system according to claim 3, wherein the strip has a variable section along at least a part of its length.

5. A system according to claim 3, wherein the first and second portions of each of the bottom and top surfaces are parallel to one another.

6. A system according to claim 5, wherein the first and second portions of each of the bottom and top surfaces are positioned at different heights.

7. A system according to claim 5, wherein the upper and lower components are stationary relative to one another.

8. A system according to claim 3, wherein the upper and lower components are coupled to one another.

9. A system according to claim 5, wherein the metallic strip is continuously deformed to have spaced and parallel stretches and a bent stretch extending between and joining the parallel stretches of the metallic strip, whereby during the relative displacement between the upper and lower components and the strip, the parallel stretches extend complementary to the first and second end portions of the surfaces and the bent stretch extends complementary to the intermediate portion of the top and bottom surfaces of the lower and upper components.

* * * * *